(12) United States Patent
Wang

(10) Patent No.: US 9,273,851 B2
(45) Date of Patent: Mar. 1, 2016

(54) BACKLIGHT MODULE AND LIQUID CRYSTAL DISPLAY DEVICE

(71) Applicant: Shenzhen China Star Optoelectronics Technology Co., Ltd., Shenzhen, Guangdong (CN)

(72) Inventor: Yewen Wang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 13/818,987

(22) PCT Filed: Feb. 4, 2013

(86) PCT No.: PCT/CN2013/071318
§ 371 (c)(1),
(2) Date: Feb. 25, 2013

(87) PCT Pub. No.: WO2014/117400
PCT Pub. Date: Jul. 8, 2014

(65) Prior Publication Data
US 2014/0211448 A1    Jul. 31, 2014

(30) Foreign Application Priority Data
Jan. 30, 2013    (CN) .......................... 2013 1 0036146

(51) Int. Cl.
*F21V 13/02*    (2006.01)
*G02F 1/1335*    (2006.01)

(52) U.S. Cl.
CPC .......... *F21V 13/02* (2013.01); *G02F 1/133603* (2013.01); *G02F 1/133606* (2013.01); *G02F 2001/133614* (2013.01); *G02F 2202/108* (2013.01)

(58) Field of Classification Search
CPC .... G02B 6/005; G02B 6/0068; G02B 6/0236; G02F 1/133603; G02F 1/133606; G02F 1/133609; G02F 1/133611; F21K 9/56
USPC ............... 362/23.2, 23.11, 33, 84, 97.1–97.4, 362/231, 235, 240–246, 249.01, 249.02, 362/293, 306, 307, 311.01, 326–328, 540, 362/543–546, 561, 602, 618, 627, 800, 362/812; 40/541–543, 564, 565, 570, 572, 40/581; 250/461.1; 349/57, 58, 61–64, 71, 349/112; 313/498, 500, 501–504; 257/89, 257/98–100, E33.061
See application file for complete search history.

(56) References Cited

U.S. PATENT DOCUMENTS 7,052,152 B2 * 5/2006 Harbers et al. .................. 362/30
7,819,539 B2 * 10/2010 Kim et al. ....................... 362/84
(Continued)

FOREIGN PATENT DOCUMENTS

CN        101232070 A       7/2008
CN        102759050 A       10/2012
(Continued)

*Primary Examiner* — Hargobind S Sawhney
(74) *Attorney, Agent, or Firm* — Andrew C. Cheng

(57) ABSTRACT

The present invention provides a backlight module and liquid crystal display device. The backlight module includes diffuser plate, substrate, fluorescent layer and light-emitting chip. The fluorescent layer is disposed on a light-entering surface of diffuser plate, and the fluorescent layer includes quantum dot (QD). The light-emitting chip is disposed on the substrate and the light-emitting chip is between substrate and fluorescent layer for irradiating on the fluorescent layer to excite the quantum dots to emit light to form white backlight source. The present invention uses quantum dots to effectively increase luminance, color saturation and avoid chroma offset. The quantum dots can emit uniform light and reduce thickness of the backlight module.

15 Claims, 1 Drawing Sheet

(56) References Cited

U.S. PATENT DOCUMENTS

| | | | |
|---|---|---|---|
| 7,914,197 B2* | 3/2011 | Naijo et al. | 362/627 |
| 7,967,460 B2* | 6/2011 | Yun et al. | 362/97.1 |
| 8,118,469 B2* | 2/2012 | Shinkai et al. | 362/620 |
| 8,183,585 B2* | 5/2012 | Scotch et al. | 257/97 |
| 8,210,701 B2* | 7/2012 | Igarashi et al. | 362/97.1 |
| 8,408,778 B2* | 4/2013 | Park | 362/618 |
| 8,469,530 B2* | 6/2013 | Ito et al. | 362/84 |
| 8,471,283 B2* | 6/2013 | Ishii et al. | 257/98 |
| 8,517,551 B2* | 8/2013 | Tsukahara et al. | 362/84 |
| 8,550,645 B2* | 10/2013 | Miki et al. | 362/97.2 |
| 2007/0262714 A1* | 11/2007 | Bylsma | 313/512 |
| 2008/0278655 A1* | 11/2008 | Moon et al. | 349/58 |
| 2010/0187975 A1* | 7/2010 | Tsukahara et al. | 313/503 |
| 2011/0211354 A1* | 9/2011 | Kim | 362/311.01 |
| 2012/0113672 A1* | 5/2012 | Dubrow et al. | 362/602 |
| 2012/0274882 A1 | 11/2012 | Jung | |
| 2014/0071655 A1* | 3/2014 | Wang | 362/84 |

FOREIGN PATENT DOCUMENTS

| | | |
|---|---|---|
| CN | 102767760 A | 11/2012 |
| CN | 102798060 A | 11/2012 |
| CN | 202613209 U | 12/2012 |

\* cited by examiner

BACKLIGHT MODULE AND LIQUID CRYSTAL DISPLAY DEVICE

BACKGROUND OF THE INVENTION

1. Field of the Invention

The present invention relates to the field of liquid crystal displaying techniques, and in particular to a backlight module and a liquid crystal display device using the backlight module.

2. The Related Arts

The backlight source for liquid crystal display device (LCD) includes white light-emitting diode (LED) and cold cathode fluorescent lamp (CCFL), wherein white LED is more environmentally friendly and higher in efficiency.

In known technology, white LED utilizes a mix of blue LED chip with Yttrium Aluminum Garnet (YAG), an alumina synthesis spar for generating laser beam, to obtain white light. However, YAG is prone to oxidation by high temperature, leading to temperature quenching, which is a shortcoming that restricts the application. The white LED comprises phosphor and chip packaged together. Specifically, in direct-lit white LED, a large power LED (1 watt or more) is used to reduce the cost. During the usage, the heat-dissipation may be ineffective and the heat may affect the phosphor, leading to lower luminance, color saturation deviation and chrome offset.

SUMMARY OF THE INVENTION

The technical issue to be addressed by the present invention is the lower luminance, color saturation deviation and chrome offset caused by using phosphor in known liquid crystal displaying technique. The present invention provides a backlight module and a liquid crystal display device, which can effectively increase luminance, color saturation and avoid chroma offset.

The present invention provides a backlight module, which comprises: a diffuser plate and a substrate, disposed oppositely, the substrate being a aluminum substrate for dissipating heat of the light-emitting chip; a fluorescent layer, disposed on a light-entering surface of the diffuser plate, the fluorescent layer comprising quantum dot (QD), and the quantum dot material comprising: CdSe, ZnSe and CdS, formed by predefined quality and ratio; a light-emitting chip, the light-emitting chip comprising UV LED chip and/or blue LED chip, the light-emitting chip being disposed separately from the fluorescent layer, the light-emitting chip being disposed on the substrate and the light-emitting chip being disposed between the substrate and the fluorescent layer for irradiating on the fluorescent layer to excite the quantum dots to emit light to form white backlight source.

According to a preferred embodiment of the present invention, the backlight module further comprises a backplane; the substrate is disposed on the inner side of the backplane; and a reflector is disposed between the backplane and the substrate.

According to a preferred embodiment of the present invention, the backlight module further comprises a brightness enhancement film, and the brightness enhancement film is disposed between the fluorescent layer and the diffuser plate.

According to a preferred embodiment of the present invention, the number of the light-emitting chip is plural, the plurality of the light-emitting chips is disposed with predefined interval, and the distance between the light-emitting chips to the fluorescent layer is half of the predefined interval.

The present invention provides a backlight module, which comprises: a diffuser plate, a substrate, a fluorescent layer and a light-emitting chip; the diffuser plate and the substrate being disposed oppositely, the fluorescent layer being disposed on a light-entering surface of the diffuser plate, the fluorescent layer comprising quantum dot (QD), the light-emitting chip being disposed on the substrate and the light-emitting chip being disposed between the substrate and the fluorescent layer for irradiating on the fluorescent layer to excite the quantum dots to emit light to form white backlight source.

According to a preferred embodiment of the present invention, the quantum dot material comprises: CdSe, ZnSe and CdS, the CdSe, ZnSe and CdS are mixed by predefined quality and ratio to form white backlight source; and the light-emitting chip is disposed separately from the fluorescent layer.

According to a preferred embodiment of the present invention, the light-entering surface of the diffuser plate is disposed with a protective film, and the fluorescent layer is coated on the protective film.

According to a preferred embodiment of the present invention, the light-emitting chip comprises UV LED chip and/or blue LED chip.

According to a preferred embodiment of the present invention, the substrate is an aluminum substrate and dissipates heat of the light-emitting chip.

According to a preferred embodiment of the present invention, the backlight module further comprises a backplane; the substrate is disposed on the inner side of the backplane; and a reflector is disposed between the backplane and the substrate.

According to a preferred embodiment of the present invention, the power of the light-emitting chip is more than 1 watt.

According to a preferred embodiment of the present invention, the backlight module further comprises a brightness enhancement film, and the brightness enhancement film is disposed between the fluorescent layer and the diffuser plate.

According to a preferred embodiment of the present invention, the number of the light-emitting chip is plural, the plurality of the light-emitting chips is disposed with predefined interval, and the distance between the light-emitting chips to the fluorescent layer is half of the predefined interval.

The present invention provides a liquid crystal display device, which comprises: a backlight module; the backlight module further comprising: a diffuser plate and a substrate, disposed oppositely; a fluorescent layer, disposed on a light-entering surface of the diffuser plate, the fluorescent layer comprising quantum dot (QD); a light-emitting chip, the light-emitting chip comprising UV LED chip and/or blue LED chip, the light-emitting chip being disposed on the substrate and the light-emitting chip being disposed between the substrate and the fluorescent layer for irradiating on the fluorescent layer to excite the quantum dots to emit light to form white backlight source.

According to a preferred embodiment of the present invention, the quantum dot material comprises: CdSe, ZnSe and CdS, the CdSe, ZnSe and CdS are mixed by predefined quality and ratio to form white backlight source; and the light-emitting chip is disposed separately from the fluorescent layer.

According to a preferred embodiment of the present invention, the light-entering surface of the diffuser plate is disposed with a protective film, and the fluorescent layer is coated on the protective film.

According to a preferred embodiment of the present invention, the ht-emitting chip comprises UV LED chip and/or blue LED chip.

According to a preferred embodiment of the present invention, the substrate is an aluminum substrate and dissipates heat of the light-emitting chip.

According to a preferred embodiment of the present invention, the backlight module further comprises a backplane; the substrate is disposed on the inner side of the backplane; and a reflector is disposed between the backplane and the substrate.

The efficacy of the present invention is that to be distinguished from the state of the art. The present invention substitutes the phosphor in fluorescent layer of the known technique with quantum dot material so as to effectively enhance luminance and color saturation and avoid the chroma offset problem through controlling the diameter distribution of the quantum dot material in combination with light-emitting chip to induce excited light-emitting. In addition, the disposition of the fluorescent layer of the quantum dot material on the light-entering surface of the diffuser plate further enable uniform light emission of the quantum dot material and reduce the thickness of the backlight module. Also, the light-emitting chip and the fluorescent layer are disposed separately to avoid the impact of the heat generated by the light-emitting chip on the quantum dot material of the fluorescent layer as well as save energy and be environmentally friendly.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
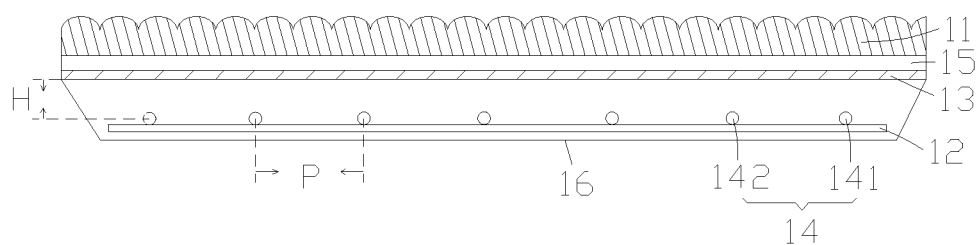
FIG. 1 is a schematic view showing the structure of an embodiment of the backlight module of the present invention.

Referring to FIG. 1, FIG. 1 is a schematic view showing the structure of the first embodiment of the backlight module of the present invention. The backlight module of the present embodiment comprises, but is not limited to, a diffuser plate 11, a substrate 12, a fluorescent layer 13 and a light-emitting chip 14.

The instant embodiment does not impose specific restriction on the material of the diffuser plate 11 as long as the material can realize diffusing the light by interfering with the light. In other embodiments, to enhance the endurance of the light and avoid yellowing, a material with lower refraction index and high transparency, such as, plastic crystal, can be used. The proliferation agent can also be added to increase the uniform diffusion capability of light.

The substrate 12 and the diffuser plate 11 are disposed oppositely, wherein the opposite disposition can be either parallel with a gap or leaning against each other with a gap. No specific restriction is imposed as long as uniform light diffusion can be guaranteed. The substrate 12 can be an aluminum substrate. That is, the substrate 12 is made of aluminum. With material, such as, aluminum, with good heat-dissipation property, the heat-dissipation capability of the substrate 12 can be enhanced. In addition, conductive circuit (not shown) is formed on the substrate 12, which can be easily understood for those with ordinary skills in the field and will not be described in details.

The fluorescent layer 13 is disposed on the light-entering surface of the diffuser plate 11. The fluorescent layer 13 comprises quantum dots. Specifically, when the fluorescent layer 13 is excited by light or electricity to emit light, the emitted light penetrates the diffuser plate 11 from the light-entering surface to reach the inside of the diffuser plate 11. The interference is conducted inside the diffuser plate 11 and uniformly diffused from the light-exiting surface of the diffuser plate 11. It should be noted that the fluorescent layer 13 can be directly coated on the light-entering surface of the diffuser plate 11.

In the instant embodiment, the quantum dots are semiconductor nanocrystal, specifically, can be manufactured with II-VI or III-V group elements. The quantum dot material are the nanocrystal with the properties of stable chemical structure, soluble in water and the radius between 2-20 nm. The quantum dot material of the instant embodiment comprises, but is not limited to CdSe, ZnSe and CdS, wherein the CdSe, ZnSe and CdS are mixed according to predefined quality and ratio to form white backlight source. Specifically, the present embodiment can adopt one or more different sizes, such as, 3, of CdSe, ZnSe and CdS to obtain the three primary colors RGB, and obtain the white light by controlling the ratio of the different size materials. In addition, in other embodiments, the CdTe can also be used, which can be easily understood for those with ordinary skills in the field and will not be described in details. During formation, the quantum dot materials of different sizes can be further mixed with anti-UV resin thoroughly and spraying on the light-entering surface of the diffuser plate 11 to form the fluorescent layer 13.

Compared to the known phosphor, the quantum dot material of the fluorescent layer 13 of the instant embodiment provides rich colors. A single kind of semiconductor nanocrystal can generate a marker family of light of different colors and wavelength according to the size of the nanocrystal, which cannot be realized by dye molecules such as, phosphor. In addition, the spectrum excited by the fluorescent layer 13 in the instant embodiment is wide and continuously distributed, as well as, good monochroma property, adjustable color, endurable to repetitive excitement and emission, and persistent stability. Specifically, the quantum dot material of the fluorescent layer 13 has a broad excitation spectrum and a narrow emission spectrum, while the conventional organic powder dye fluorescence excitation light wavelength range is narrow, which typically requires excitation lights of various wavelengths to excited different fluorescent dyes, which is inconvenient to the actual application. In addition, the quantum dot material in the instant embodiment has narrow and symmetrical fluorescent emission peaks and is without smearing, thus, no spectrum overlapping when different colors of quantum dot material are used. For example, for ZnS-coated CdSe, when the diameter of the CdSe core is 1.8 nm, a blue light is emitted; when the diameter of the CdSe core is 7 nm, a red light is emitted. In other words, the fluorescent light of the CdSe of different radius sizes can cover the entire visible light spectrum. Similarly, the other two or three kinds of semiconductor nanocrystal of the instant embodiment all have the same light-emission property, which can be easily understood for those with ordinary skills in the field and will not be described in details.

The light-emitting chip 14 is disposed on the substrate 12. Furthermore, the light-emitting chip 14 is disposed between the substrate 12 and the fluorescent layer 13 for irradiating on the fluorescent layer 13 to excite the quantum dot material to emit light to form the backlight source. As aforementioned, the instant embodiment can utilize an aluminum substrate to improve heat-dissipation effect on the light-emitting chip 14.

It should be noted that, as shown in FIG. 1, the fluorescent layer 13 and the light-emitting chips 14 are disposed separately. In other words, the fluorescent layer 13 is disposed on the light-entering surface of the diffuser plate 11 and the light-emitting chip 14 is disposed on the substrate 12. Compared to the know technique to package the fluorescent layer 13 and the light-emitting chips 14 together, the instant embodiment is better to facilitate uniform light emission of the quantum dot material and effectively reduce the thickness of the backlight module. Also, the instant embodiment can also effectively avoid the impact of the heat generated by the light-emitting chip 14 on the quantum dot material of the fluorescent layer 13 so as to save energy and be environmentally friendly.

The instant embodiment comprises a plurality of light-emitting chips 14, for example, the first light-emitting chip 141, the second light-emitting chip 142, and so on. The light-emitting chip 14 of the instant embodiment, comprises, but is not restricted to, UV LED chip and/or blue LED chip. In other words, the light-emitting chip 14 can be a UV LED chip, a blue LED chip or a UV LED chip and a blue LED chip used together, which can be easily understood for those with ordinary skills in the field and will not be described in details. Furthermore, to further enhance uniform light emission, the plurality of the light-emitting chips 14 of the instant embodiment can be disposed with predefined interval P, and the distance H between the light-emitting chip 14 and the fluorescent layer 13 can be a half of the predefined interval P. In addition, the thickness of the light box formed by the light-emitting chip 14, the diffuser plate 11 and the fluorescent layer 13 can be equal (or basically equal to) the predefined interval P. Based on the light-emitting angle of the light-emitting chip 14 and the fluorescent layer 13, the uniform light emission can be ensured.

In addition, the power of the light-emitting chip 14 of the present embodiment can be greater than 1 watt, such as, 2 watts, 10 watts or 100 watts in the known technique. Correspondingly, the backlight module of the present embodiment can also comprises secondary lens (not shown), for changing the light-emitting angle of the light-emitting chip 14. The secondary lens can be disposed after packaging the light-emitting chip 14 to the substrate 12 to form light bar for increasing the light-emitting angle of the light-emitting chip 14 to further improve uniform light emission. The specific manufacturing can adopt the known technique, which can be easily understood for those with ordinary skills in the field and will not be described in details. Furthermore, the light-emitting angle of the light-emitting chip 14 can be adjusted by the secondary lens of the present embodiment to any angle between 5° and 160°, and the light field can be circular, oval or rectangular. The secondary lens of the present embodiment can be made of optical grade PMMA or glass, and not specific restriction is imposed here.

As shown in FIG. 1, the light-entering surface of the diffuser plate 11 can also be disposed with a protective film 15, and the fluorescent layer 13 is coated on the protective film 15. It should be understood that the backlight module of the present embodiment can further comprises a backplane 16 and a back frame (not shown). Correspondingly, the substrate 12 is disposed on the inner side of the backplane 16.

The present embodiment substitutes the phosphor in fluorescent layer of the known technique with quantum dot material so as to effectively enhance luminance and color saturation and avoid the chroma offset problem through controlling the diameter distribution of the quantum dot material in combination with light-emitting chip 14 to induce excited light-emitting. In addition, the disposition of the fluorescent layer 13 of the quantum dot material on the light-entering surface of the diffuser plate 11 further enable uniform light emission of the quantum dot material and reduce the thickness of the backlight module. Also, the light-emitting chip 14 and the fluorescent layer 13 are disposed separately to avoid the impact of the heat generated by the light-emitting chip on the quantum dot material of the fluorescent layer 1 as well as save energy and be environmentally friendly.

Figure 2:
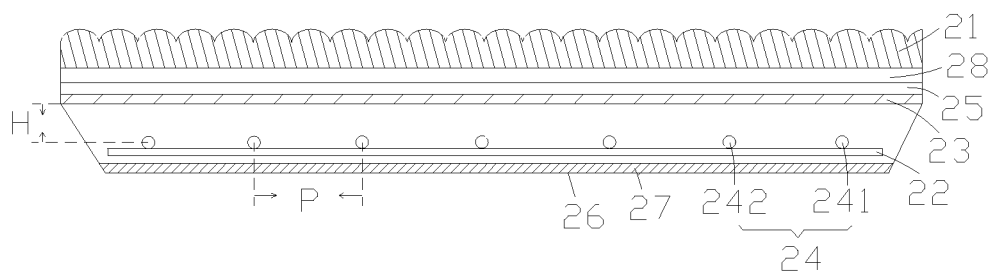
FIG. 2 is a schematic view showing the structure of another embodiment of the backlight module of the present invention.

Referring to FIG. 2, FIG. 2 is a schematic view showing the structure of another embodiment of the backlight module of the present invention. The backlight module of the present embodiment comprises, but is not limited to, a diffuser plate 21, a substrate 22, a fluorescent layer 23, a light-emitting chip 24, a protective film 25, a backplane 26, a reflector 27 and a brightness enhancement film 28.

In the instant embodiments, a material with lower refraction index and high transparency, such as, plastic crystal, can be used. The proliferation agent can also be added to increase the uniform diffusion capability of light.

The substrate 22 and the diffuser plate 21 are disposed oppositely. The substrate 22 can be an aluminum substrate. That is, the substrate 22 is made of aluminum. With material, such as, aluminum, with good heat-dissipation property, the heat-dissipation capability of the substrate 22 can be enhanced. In addition, conductive circuit (not shown) is formed on the substrate 12, which can be easily understood for those with ordinary skills in the field and will not be described in details.

The fluorescent layer 23 is disposed on the light-entering surface of the diffuser plate 21. The fluorescent layer 23 comprises quantum dots. Specifically, when the fluorescent layer 23 is excited by light or electricity to emit light, the emitted light penetrates the diffuser plate 21 from the light-entering surface to reach the inside of the diffuser plate 21. The interference is conducted inside the diffuser plate 21 and uniformly diffused from the light-exiting surface of the diffuser plate 21. It should be noted that the fluorescent layer 23 can be directly coated on the light-entering surface of the diffuser plate 21.

In the instant embodiment, the quantum dots are semiconductor nanocrystal, specifically, can be manufactured with II-VI or III-V group elements. The quantum dot material are the nanocrystal with the properties of stable chemical structure, soluble in water and the radius between 2-20 nm. The quantum dot material of the instant embodiment comprises, but is not limited to, CdSe, ZnSe and CdS, wherein the CdSe, ZnSe and CdS are mixed according to predefined quality and ratio to form white backlight source. Specifically, the present embodiment can adopt one or more different sizes, such as, 3, of CdSe, ZnSe and CdS to obtain the three primary colors RGB, and obtain the white light by controlling the ratio of the different size materials. In addition, in other embodiments, the CdTe can also be used, which can be easily understood for those with ordinary skills in the field and will not be described in details. During formation, the quantum dot materials of different sizes can be further mixed with anti-UV resin thoroughly and spraying on the light-entering surface of the diffuser plate 21 to form the fluorescent layer 23.

The quantum dot material of the fluorescent layer 23 has a broad excitation spectrum and a narrow emission spectrum, while the conventional organic powder dye fluorescence excitation light wavelength range is narrow, which typically requires excitation lights of various wavelengths to excited different fluorescent dyes, which is inconvenient to the actual application. In addition, the quantum dot material in the instant embodiment has narrow and symmetrical fluorescent emission peaks and is without smearing, thus, no spectrum overlapping when different colors of quantum dot material are used. For example, for ZnS-coated CdSe, when the diameter of the CdSe core is 1.8 nm, a blue light is emitted; when the diameter of the CdSe core is 7 nm, a red light is emitted. In other words, the fluorescent light of the CdSe of different radius sizes can cover the entire visible light spectrum. Similarly, the other two or three kinds of semiconductor nanocrystal of the instant embodiment all have the same light-emission property, which can be easily understood for those with ordinary skills in the field and will not be described in details.

The light-emitting chip 24 is disposed on the substrate 22. Furthermore, the light-emitting chip 24 is disposed between the substrate 22 and the fluorescent layer 23 for irradiating on the fluorescent layer 23 to excite the quantum dot material to emit light to form the backlight source. As aforementioned, the instant embodiment can utilize an aluminum substrate to improve heat-dissipation effect on the light-emitting chip 24.

It should be noted that, as shown in FIG. 2, the fluorescent layer 23 and the light-emitting chips 24 are disposed separately. In other words, the fluorescent layer 23 is disposed on the light-entering surface of the diffuser plate 21 and the light-emitting chip 24 is disposed on the substrate 22. Compared to the know technique to package the fluorescent layer 23 and the light-emitting chips 24 together, the instant embodiment is better to facilitate uniform light emission of the quantum dot material and effectively reduce the thickness of the backlight module. Also, the instant embodiment can also effectively avoid the impact of the heat generated by the light-emitting chip 24 on the quantum dot material of the fluorescent layer 23 so as to save energy and be environmentally friendly.

The instant embodiment comprises a plurality of light-emitting chips 24, for example, the first light-emitting chip 241, the second light-emitting chip 242, and so on. The light-emitting chip 24 of the instant embodiment, comprises, but is not restricted to, UV LED chip and/or blue LED chip. In other words, the light-emitting chip 14 can be a UV LED chip, a blue LED chip or a UV LED chip and a blue LED chip used together, which can be easily understood for those with ordinary skills in the field and will not be described in details. Furthermore, to further enhance uniform light emission, the plurality of the light-emitting chips 24 of the instant embodiment can be disposed with predefined interval P, and the distance H between the light-emitting chip 24 and the fluorescent layer 23 can be a half of the predefined interval P. In addition, the thickness of the light box formed by the light-emitting chip 24, the diffuser plate 21 and the fluorescent layer 23 can be equal (or basically equal to) the predefined interval P. Based on the light-emitting angle of the light-emitting chip 24 and the fluorescent layer 23, the uniform light emission can be ensured.

In addition, the power of the light-emitting chip 24 of the present embodiment can be greater than 1 watt, such as, 2 watts, 10 watts or 100 watts in the known technique. Correspondingly, the backlight module of the present embodiment can also comprises secondary lens (not shown), for changing the light-emitting angle of the light-emitting chip 24. The secondary lens can be disposed after packaging the light-emitting chip 24 to the substrate 22 to form light bar for increasing the light-emitting angle of the light-emitting chip 24 to further improve uniform light emission. The specific manufacturing can adopt the known technique, which can be easily understood for those with ordinary skills in the field and will not be described in details.

The fluorescent layer 23 is coated on the protective film 25. The substrate 22 is disposed on the inner side of the backplane 26. The difference from the previous embodiment is that a reflector 27 is disposed on the inner side of the backplane 26. Through reflector 27, the present embodiment can effectively enhance the light emission and uniformity of the backlight module.

To further enhance the light emission of the backlight module and improve the display quality of the liquid crystal display device, the present embodiment disposes a brightness enhancement film 28 between the protective film 25 and the diffuser plate 21. Through the disposition of the brightness enhancement film 28, the light emission of the backlight module is improved. The brightness enhancement film 28 can be normal prism sheet, micro-lens film, reflective polarizer, and so on, which can be easily understood for those with ordinary skills in the field and will not be described in details.

The present embodiment substitutes the phosphor in fluorescent layer of the known technique with quantum dot material so as to effectively enhance luminance and color saturation and avoid the chroma offset problem through controlling the diameter distribution of the quantum dot material in combination with light-emitting chip 24 to induce excited light-emitting. In addition, the disposition of the fluorescent layer 23 of the quantum dot material on the light-entering surface of the diffuser plate 21 further enable uniform light emission of the quantum dot material and reduce the thickness of the backlight module. Also, the light-emitting chip 24 and the fluorescent layer 23 are disposed separately to avoid the impact of the heat generated by the light-emitting chip on the quantum dot material of the fluorescent layer 23 as well as save energy and be environmentally friendly.

The present invention also provides a liquid crystal display device, which comprises one or more backlight modules described in previous embodiments. The backlight module uses direct-lit backlight source. The liquid crystal display device can further comprises a liquid crystal panel and a front frame, which can be easily understood for those with ordinary skills in the field and will not be described in details.

The present embodiment substitutes the phosphor in fluorescent layer of the known technique with quantum dot material so as to effectively enhance luminance and color saturation and avoid the chroma offset problem through controlling the diameter distribution of the quantum dot material in combination with light-emitting chip to induce excited light-emitting. In addition, the disposition of the fluorescent layer of the quantum dot material on the light-entering surface of the diffuser plate further enable uniform light emission of the quantum dot material and reduce the thickness of the backlight module. Also, the light-emitting chip and the fluorescent layer are disposed separately to avoid the impact of the heat generated by the light-emitting chip on the quantum dot material of the fluorescent layer as well as save energy and be environmentally friendly.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:
1. A backlight module, which comprises:
 a diffuser plate and a substrate, disposed oppositely, the substrate being an aluminum substrate for dissipating heat of the light-emitting chip;

a fluorescent layer, disposed on a light-entering surface of the diffuser plate, the fluorescent layer comprising a plurality of quantum dots;

at least one light-emitting chip, the light-emitting chip comprising UV LED chip and blue LED chip, the light-emitting chip being disposed separately from the fluorescent layer, the light-emitting chip being disposed on the substrate and the light-emitting chip being disposed between the substrate and the fluorescent layer for irradiating on the fluorescent layer to excite the quantum dots to emit light to form white backlight source; and a backplane, wherein the quantum dots are mixed with anti-UV resin material, the substrate is disposed on the inner side of the backplane, and a reflector is disposed between the backplane and the substrate while a part of the reflector being covered by the substrate and another part of the reflector being not covered by the substrate, wherein light emitted to the part of the reflector being not covered by the substrate is reflected by the reflector.

2. The backlight module as claimed in claim 1, characterized in that the backlight module further comprises a brightness enhancement film, and the brightness enhancement film is disposed between the fluorescent layer and the diffuser plate.

3. The backlight module as claimed in claim 1, characterized in that the number of the light-emitting chip is plural, the plurality of the light-emitting chips is disposed with predefined interval, and the distance between the light-emitting chips to the fluorescent layer is half of the predefined interval.

4. A backlight module, which comprises:
a diffuser plate and a substrate, disposed oppositely;
a fluorescent layer, disposed on a light-entering surface of the diffuser plate, the fluorescent layer comprising a plurality of quantum dots;
at least one light-emitting chip, the light-emitting chip being disposed on the substrate and the light-emitting chip being disposed between the substrate and the fluorescent layer for irradiating on the fluorescent layer to excite the quantum dots to emit light to form white backlight source; and
a backplane,
wherein the quantum dots are mixed with anti-UV resin material, the substrate is disposed on the inner side of the backplane, and a reflector is disposed between the backplane and the substrate while a part of the reflector being covered by the substrate and another part of the reflector being not covered by the substrate,
wherein light emitted to the part of the reflector being not covered by the substrate is reflected by the reflector.

5. The backlight module as claimed in claim 4, characterized in that the quantum dots comprise: CdSe, ZnSe and CdS, the CdSe, ZnSe and CdS are mixed by predefined quality and ratio to form white backlight source; and the light-emitting chip is disposed separately from the fluorescent layer.

6. The backlight module as claimed in claim 5, characterized in that the light-entering surface of the diffuser plate is disposed with a protective film, and the fluorescent layer is coated on the protective film.

7. The backlight module as claimed in claim 4, characterized in that the light-emitting chip comprises UV LED chip and blue LED chip.

8. The backlight module as claimed in claim 7, characterized in that the substrate is an aluminum substrate and dissipates heat of the light-emitting chip.

9. The backlight module as claimed in claim 7, characterized in that the power of the light-emitting chip is more than 1 watt.

10. The backlight module as claimed in claim 9, characterized in that the backlight module further comprises a brightness enhancement film, and the brightness enhancement film is disposed between the fluorescent layer and the diffuser plate.

11. The backlight module as claimed in claim 7, characterized in that the number of the light-emitting chip is plural, the plurality of the light-emitting chips is disposed with predefined interval, and the distance between the light-emitting chips to the fluorescent layer is half of the predefined interval.

12. A liquid crystal display device, which comprises: a backlight module;
the backlight module further comprising:
a diffuser plate and a substrate, disposed oppositely;
a fluorescent layer, disposed on a light-entering surface of the diffuser plate, the fluorescent layer comprising a plurality of quantum dots;
a light-emitting chip, the light-emitting chip comprising UV LED chip and blue LED chip, the light-emitting chip being disposed on the substrate and the light-emitting chip being disposed between the substrate and the fluorescent layer for irradiating on the fluorescent layer to excite the quantum dots to emit light to form white backlight source; and
a backplane,
wherein the quantum dots are mixed with anti-UV resin material, the substrate is disposed on the inner side of the backplane, and a reflector is disposed between the backplane and the substrate while a part of the reflector being covered by the substrate and another part of the reflector being not covered by the substrate,
wherein light emitted to the part of the reflector being not covered by the substrate is reflected by the reflector.

13. The liquid crystal display device as claimed in claim 12, characterized in that the quantum dots comprise: CdSe, ZnSe and CdS, the CdSe, ZnSe and CdS are mixed by predefined quality and ratio to form white backlight source; and the light-emitting chip is disposed separately from the fluorescent layer.

14. The liquid crystal display device as claimed in claim 13, characterized in that the light-entering surface of the diffuser plate is disposed with a protective film, and the fluorescent layer is coated on the protective film.

15. The liquid crystal display device as claimed in claim 12, characterized in that the substrate is an aluminum substrate and dissipates heat of the light-emitting chip.

* * * * *